(12) United States Patent
Zhang et al.

(10) Patent No.: US 9,001,678 B2
(45) Date of Patent: Apr. 7, 2015

(54) FALSE ALARM REDUCTION WITH SEARCH WINDOWING AND PEAK SUPPRESSION

(75) Inventors: Honglei Zhang, Hong Kong (CN); Yuxian Zhang, Hong Kong (CN); Jun Xu, Hong Kong (CN); Wing Chau Chan, Hong Kong (CN)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 500 days.

(21) Appl. No.: 13/408,842

(22) Filed: Feb. 29, 2012

(65) Prior Publication Data

US 2013/0223241 A1   Aug. 29, 2013

(51) Int. Cl.
*G01R 31/08* (2006.01)
*H04L 12/66* (2006.01)
*H04L 27/26* (2006.01)

(52) U.S. Cl.
CPC ............ *H04L 27/26* (2013.01); *H04L 27/2656* (2013.01); *H04L 27/2671* (2013.01); *H04L 27/2675* (2013.01)

(58) Field of Classification Search
USPC .................................................. 370/252, 355
See application file for complete search history.

(56) References Cited

U.S. PATENT DOCUMENTS

| 2004/0047317 A1* | 3/2004 | Iwasaki .......................... 370/335 |
| 2005/0089087 A1 | 4/2005 | Sheen et al. |
| 2008/0310561 A1 | 12/2008 | Song et al. |
| 2009/0047956 A1* | 2/2009 | Moe et al. ...................... 455/436 |
| 2009/0191875 A1 | 7/2009 | Vujcic et al. |
| 2009/0213968 A1 | 8/2009 | Tormalehto |
| 2009/0225908 A1 | 9/2009 | Masuda et al. |
| 2010/0150277 A1 | 6/2010 | Kim et al. |
| 2010/0158050 A1 | 6/2010 | Yang |
| 2010/0220664 A1 | 9/2010 | Hooli et al. |
| 2011/0110240 A1 | 5/2011 | Bergquist et al. |

FOREIGN PATENT DOCUMENTS

| CN | 102111894A A1 | 6/2011 |
| EP | 1089478 A2 * | 4/2001 |

OTHER PUBLICATIONS

Mansour,Mohammad, Optimized Architecture for Computing Zadoff-Chu Sequences with Application to LTE, IEEE, Aug. 2009, all.*

Office Action issued for Chinese Patent Application No. 2014042500510070, dated Apr. 30, 2014, with English language translation, 5 pages.

* cited by examiner

*Primary Examiner* — Omar Ghowrwal
*Assistant Examiner* — Angel Brockman
(74) *Attorney, Agent, or Firm* — Norton Rose Fulbright US LLP

(57) ABSTRACT

The present embodiments are directed to systems and methods for detecting random access channel requests, while excluding false random access signals using search windowing and distance-based peak suppression techniques. The present embodiments additionally include further techniques for suppression of fake random access signals, including amplitude thresholds and preamble-based signal exclusion. Beneficially, the present embodiments significantly reduce the false alarm rate, while maintaining a low hardware complexity requirements. In some embodiments, worst-case false alarm rates can be reduced from as much as 20% down to nearly 0.1%.

24 Claims, 11 Drawing Sheets

FALSE ALARM REDUCTION WITH SEARCH WINDOWING AND PEAK SUPPRESSION

TECHNICAL FIELD

This invention relates to data communications and more particularly relates to false alarm reduction with search window and peak suppression.

BACKGROUND OF THE INVENTION

FIG. 1 illustrates cellular network 100 of the prior art. Each cell 102a-c in cellular network 100 is generally defined by an area in which base stations 104a-c are able to communicate with User Equipment (UE) 106a-d. Examples of UEs 106a-d include telephones, smartphones, Personal Data Assistants (PDAs), tablet computers, cellular data devices for use with laptop computers, and the like. Generally, each cell 102a-c includes one corresponding base station 104a-c.

Any number of UEs 106a-d may be found in cells 102a-c, depending on the use habits of the users of cellular network 100. For example, cell 102b includes two UEs 106c-d. In such an embodiment, both UEs 106c-d may communicate with base station 104b at the same time. Depending on the protocol used by base station 104b, UEs 106c-d may communicate simultaneously, or substantially simultaneously. Alternatively, UEs 106c-d may communicate with base station 104b within a time slot. Additionally, UEs 106a-d may move between cells as the user travels from one area to another. As shown, UE 106a may move from cell 102a to cell 102c. In this sort of case, cell 102a includes two UEs 106a-b initially, but once UE 102a moves to cell 102c, cell 102a only includes UE 106b. Thus cellular networks 100 are generally dynamic in nature, and changes in the topology of cellular network 100 may be random, based upon the user's habits.

FIG. 2 illustrates an example of a topology for any of cells 102a-c. In addition to base station 104, cells 102 may include antenna 202 coupled to base station 104. Antenna 202 receives random access signals from UEs 106 operated by user 204 in a multipath environment and mobile user 206 over Random Access Channels (RACHs) operated by base station 104. The RACH allows UEs 106 to gain initial access to cellular network 100 and facilitates uplink synchronization.

FIG. 3 illustrates RACH detection circuit 300 according to the prior art. RACH detection circuit 300 is often included in base station 104. RACH detection circuit 300 includes CP removal module 302 for removing the Cyclic Prefix (CP) from received symbols. RACH detection circuit 300 also includes downsampling/resampling module 304 for reducing a sample rate to a frequency that is suitable for use by corr-elator 306. The reduced sample rate simplifies operations of the correlator 306, particularly in FFT module 308. Correlator 306 includes Fast Fourier Transform (FFT) module 308 configured to transform the downsampled symbol into frequency domain, correlator 306 also includes subcarrier demapping module 310 and multiplier 312. Multiplier 312 multiplies the demapped subcarriers with a conjugate of a root sequence in the frequency domain. The multiplication result is then converted back to time domain by Inverse Discrete Fourier Transform (IDFT) module 314. In prior systems 300, signature detection and timing offset estimation module 316 detects a random access signal from UE 106 and determines the timing offset of the detected random access signal.

Unfortunately, as described below, RACH detection circuit 300 generates a large number of false alarms. A false alarm is an event that is a result of a RACH detection circuit detecting energy that is outside of the boundary of a signature sent by UE 106c. For example, when a UE 106c is very close to a base station 104b, the timing offset may be very low. In such an embodiment, power leakage from a random access signal sent by UE 106c to base station 104 may fall outside of detection interval for a first signature and fall within a signal detection interval of a second signature. Thus, the power leakage may appear to be a second random access signal from a second UE 106d. Such situations may trigger false alarm events.

Additionally, noise, interference, frequency offset and Doppler shifts may all contribute to false detections. For example, in a second situation, UE 106a may be far from base station 104c. Thus, the time delay may be large. If UE 106a is in a multipath environment, for example, then the multipath reflections may cross into a detection interval for a second signature. Because of the time shift, RACH detection circuit 300 may experience a false alarm because random access signals may appear to be from two separate UEs 106 to RACH detection circuit 300.

In cellular systems, UEs 106a-d send random access signals to base stations 104a-c to gain initial network access to cell network 100. Ideally base station 104a-c would detect the random access signals with high detection accuracy while maintaining a low false alarm rate. Currently, two primary methods are used by base stations for detection of random access signals. The first is a full frequency-domain method for achieving a high level of accuracy. Unfortunately, most common RACH detection circuits 300 are not able to perform full frequency-domain analysis because of the complexity of the FFT and high system resources requirements associated with such methods. The second method for detection includes down-sampling to significantly reduce hardware complexity while achieving a minimum level of acceptable performance. Unfortunately, the minimum level of acceptable performance is still not particularly accurate, and there is much room for improvement. Both of these approaches detect fake random access signals, thus causing a high false alarm rate under some circumstances.

BRIEF SUMMARY OF THE INVENTION

The present embodiments are directed to systems and methods for detecting random access channel requests, while minimizing false alarm events using search windowing and distance-based peak suppression techniques. The present embodiments additionally include further techniques for suppression peaks which may cause false alarm events, including amplitude thresholds. Beneficially, the present embodiments significantly reduce the false alarm rate, while maintaining a low hardware complexity requirement. In some embodiments, worst-case false alarm rates can be reduced from as much as 20% down to nearly 0.1%.

In one embodiment, search windowing may be applied to the correlator output to reduce the false alarm rate on a physical random access channel signal. Additionally, a Peak Suppression Algorithm (PSA) may be applied to the correlator output to remove extra preambles which may cause false alarm events in various channel conditions. Beneficially, search windowing may remove power leakage in short time offset cases. Further, the PSA may use a distance threshold to remove extra peaks due to long time offset and multipath. In one embodiment, the first peak detected may be kept. In another embodiment, the strongest peak detected may be kept.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 4:
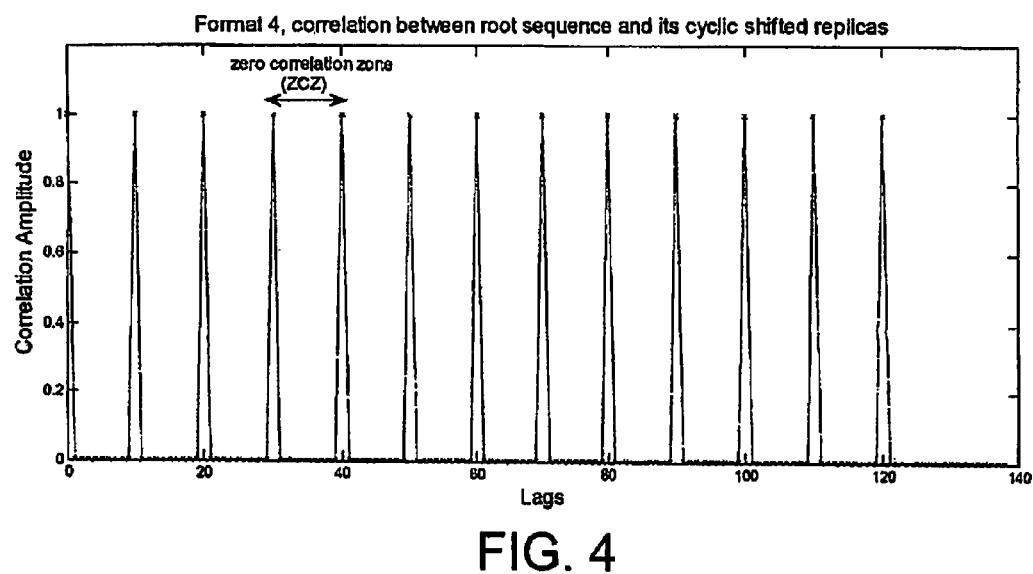
FIG. 4 is a graphical diagram illustrating an ideal output of the correlator of FIG. 3 where all preambles are sent with zero time offset in perfect channel conditions.

FIG. 4 is a graphical diagram illustrating an ideal output of correlator 306 where all preambles are sent with zero time offset in perfect channel conditions. RACH is used for communication between UEs 106a-d and base stations 104a-c in several ways. First, a RACH signal allows UEs 106a-d to gain access to cellular network 100 and perform uplink synchronization tasks. Several RACH preamble signatures may be used per cell. The preamble signatures are often constructed from cyclic shifts of pseudo-random sequences, for example Zadoff-Chu (ZC) sequences. ZC sequences have Constant Amplitude Zero Autocorrelation (CAZAC) properties, and good cross-correlation properties as compared with other sequences. Thus, FIG. 4 illustrates how preamble signatures may look under ideal operating circumstances.

Figure 1:
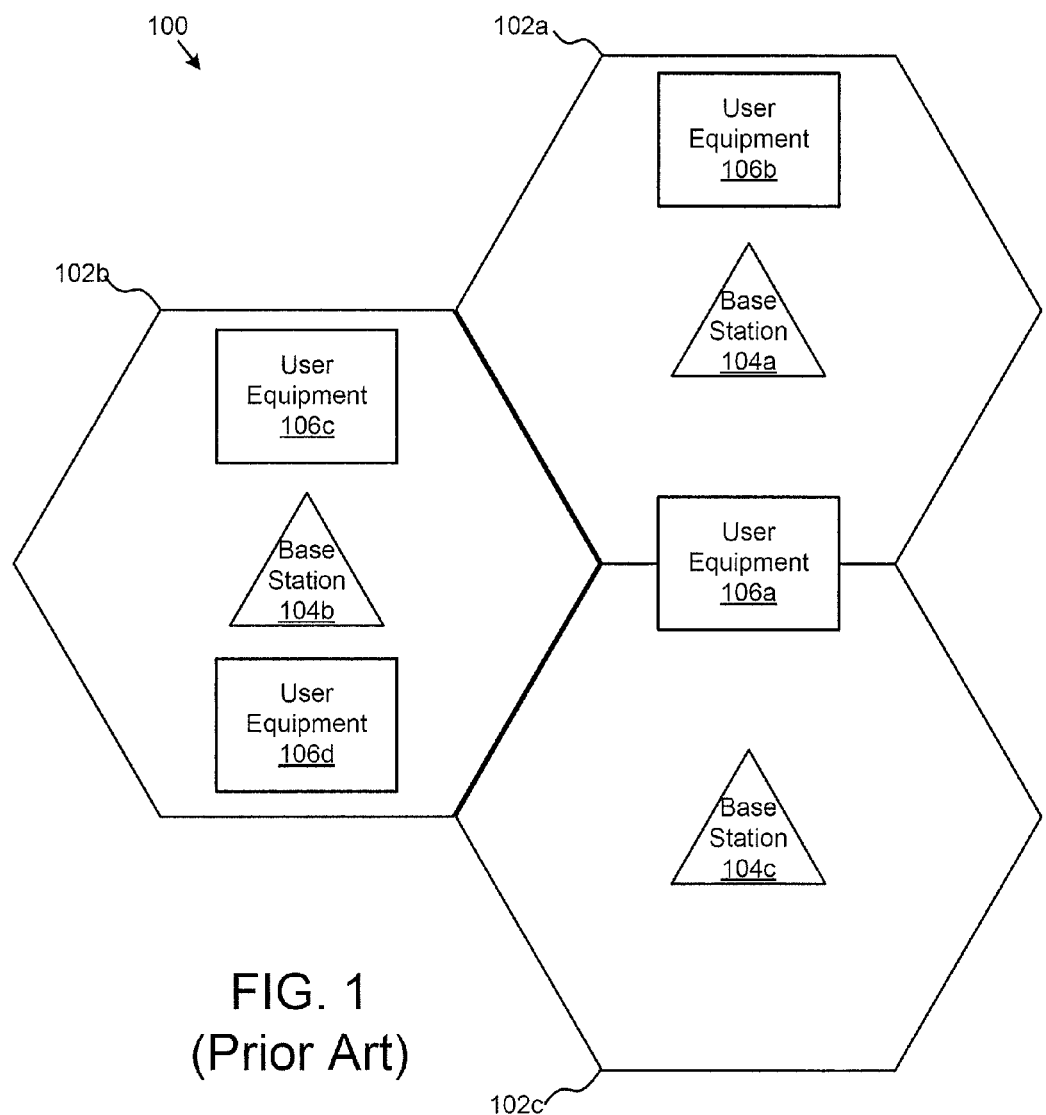
FIG. 1 is a schematic diagram illustrating a cellular network of the prior art.
Figure 2:
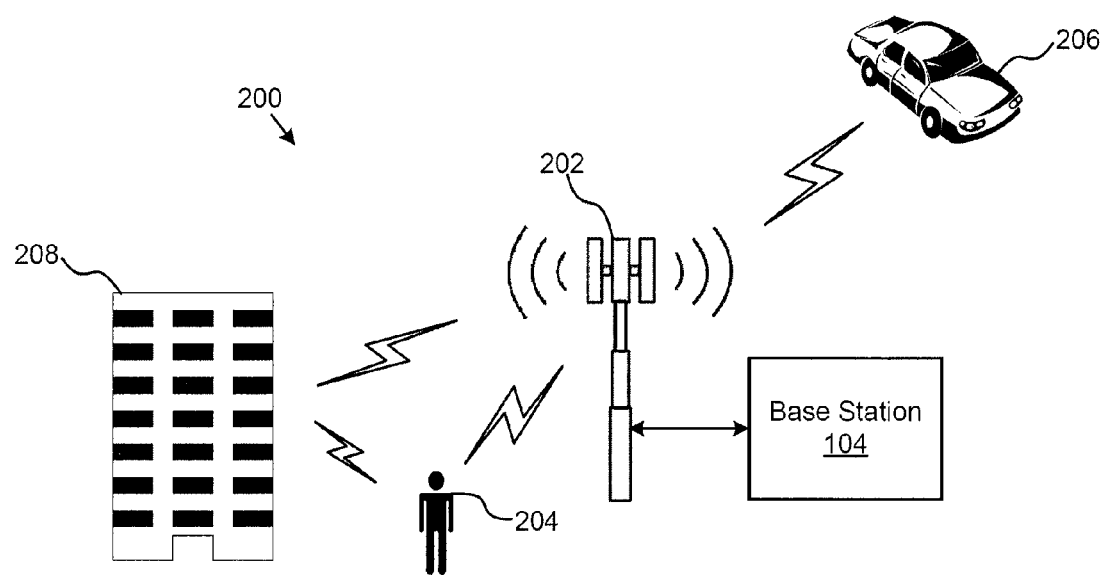
FIG. 2 is a schematic diagram illustrating a cellular network environment.
Figure 3:
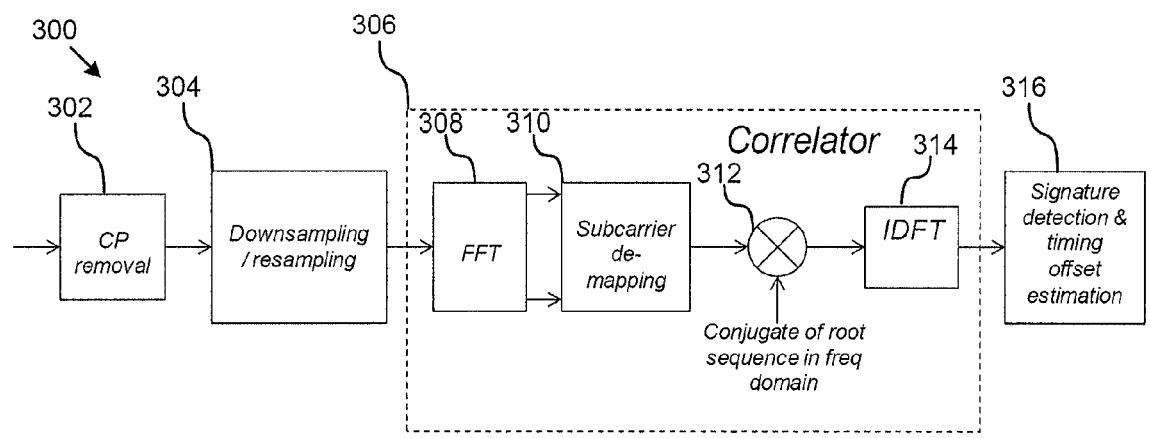
FIG. 3 is a schematic block diagram illustrating a random access channel circuit of the prior art.
Figure 5:
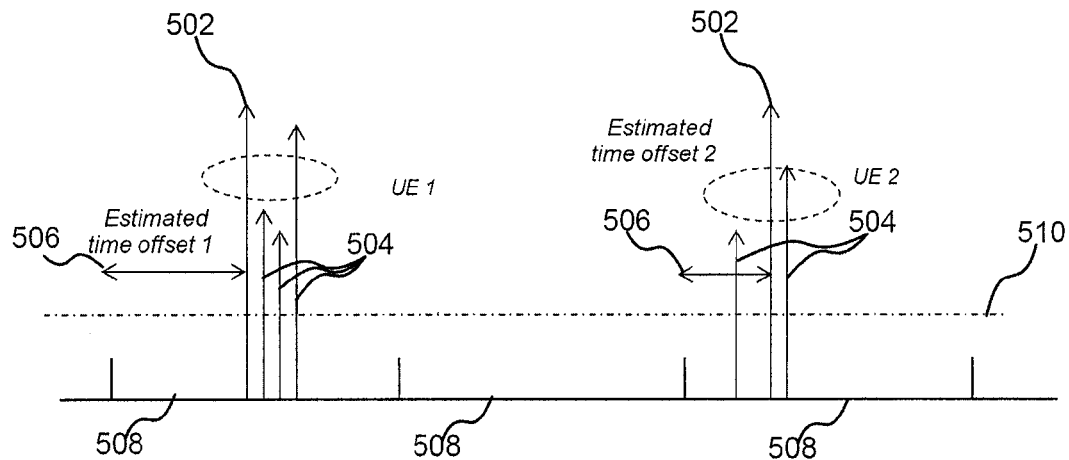
FIG. 5 is a graphical diagram illustrating the concept of RACH signature detection and methods for peak selection.

Unfortunately, the real world almost never operates in ideal conditions. Therefore, the preamble signatures received by base stations 104a-c may look more like those illustrated in FIG. 5. Highest peak 502 is typically accompanied by a plurality of multipath peaks 504. In one embodiment, only the highest peak 502 in each signature is selected, and others 504 discarded. In addition, there is often some time offset 506 between the zero time offset point for the preamble signature and the actual arrival time. These non-ideal properties can be caused by several issues as illustrated above in FIG. 2. For example, base station 104 may receive multiple multipath peaks 504 because in addition to the actual signal sent by user 204, base station 104 also receives reflected versions of the true signal which are reflected from, e.g., building 208. Time offset is caused by the round trip delay between the base station and the UE.

One method for RACH signature detection involves picking highest peak 502 in each zero correlation zone (ZCZ) 508 defined by each cyclic shift as illustrated further above in FIG. 4. In addition, an amplitude threshold 510 may be applied on low peaks 504 to eliminate any peaks (not shown) that are below a minimum amplitude level as defined by amplitude threshold 510. In such a method, the output of correlator 316 may include preamble indexes and estimates of time offset 506 for each ZCZ in which a peak was detected. Amplitude threshold 510 may be adjusted to balance missed detection and false alarm rates.

Figure 6:
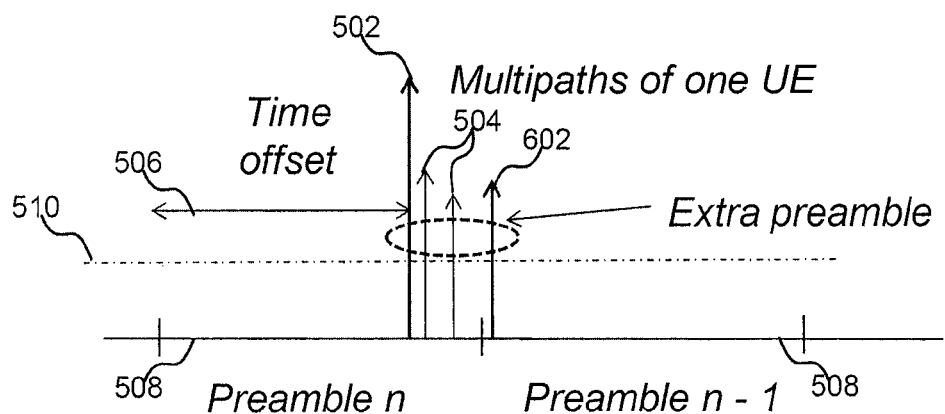
FIG. 6 is a graphical diagram illustrating examples of network conditions that may lead to false alarms.

FIG. 6 is a graphical diagram illustrating examples of network conditions that may lead to false alarm events. A high false alarm rate can significantly overload the base stations 104a-c and block real preambles from other UEs 106a-d. False detection of preambles may be caused by a variety of issues, such as power leakage due to oversampling when UE 106 is close to base station 104. Other issues that may cause false alarms include large time offsets due to round-trip delay, and large channel delay spread. FIG. 6 shows how these types of factors may contribute to false detections. For example, a highest peak 502 may exhibit a large time offset 506 due to round-trip delay, or the like. Several additional peaks 504 may be received by base stations 104a-c due to a multipath environment causing reflections of the RACH signature. In one embodiment, extra preamble 602 may be a multipath 504 of the highest peak 502 that has spilled over into the next ZCZ 508. Without the peak suppression techniques described according to the present embodiments, random access channel circuit 300 may identify extra preamble 602 as a signal received from a UE 106 on the new ZCZ 508, when in fact, it has received no such signal. This situation is one example of a false alarm event caused by extra preamble 602. In various embodiments, either a false detection or a false negative may occur.

Figure 7:
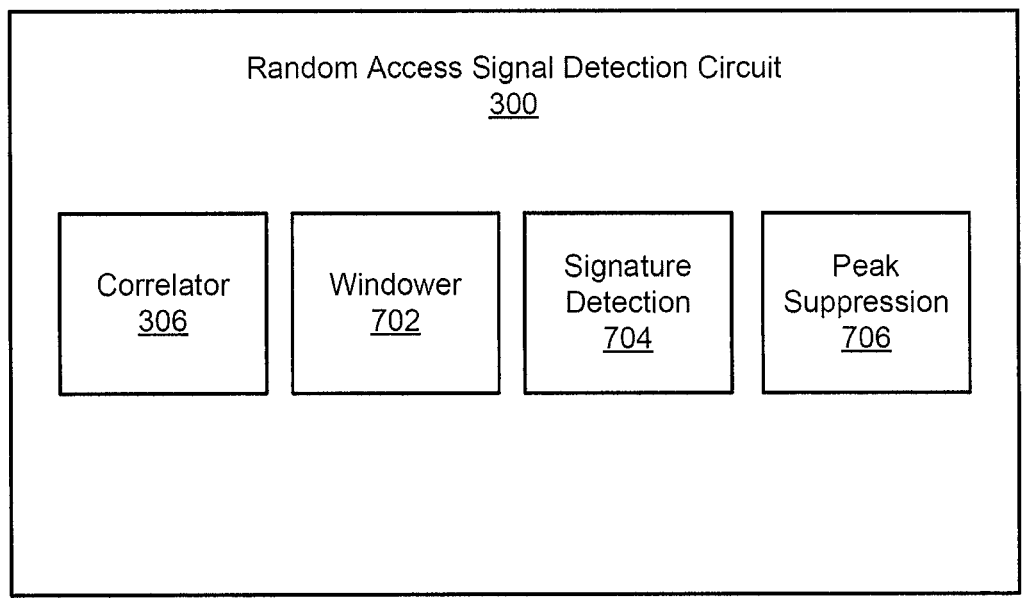
FIG. 7 is a schematic block diagram illustrating one embodiment of a random access signal detection circuit.

FIG. 7 illustrates a further embodiment of random access detection circuit 300. An embodiment of correlator 306 may provide an output to windower module 702 for window-based signal filtering. Windower module 702 may pass the windowed output to signature detection module 704, which may remove extra preambles 602 caused power leakage and short time delay as described further with reference to FIGS. 9-10. The peak suppression module 706 may then suppress other extra preambles 602 which may be caused by long large time offset due to round-trip delay, or the like. The functional operations of these various modules are described below with respect to FIGS. 8-14.

Figure 8:
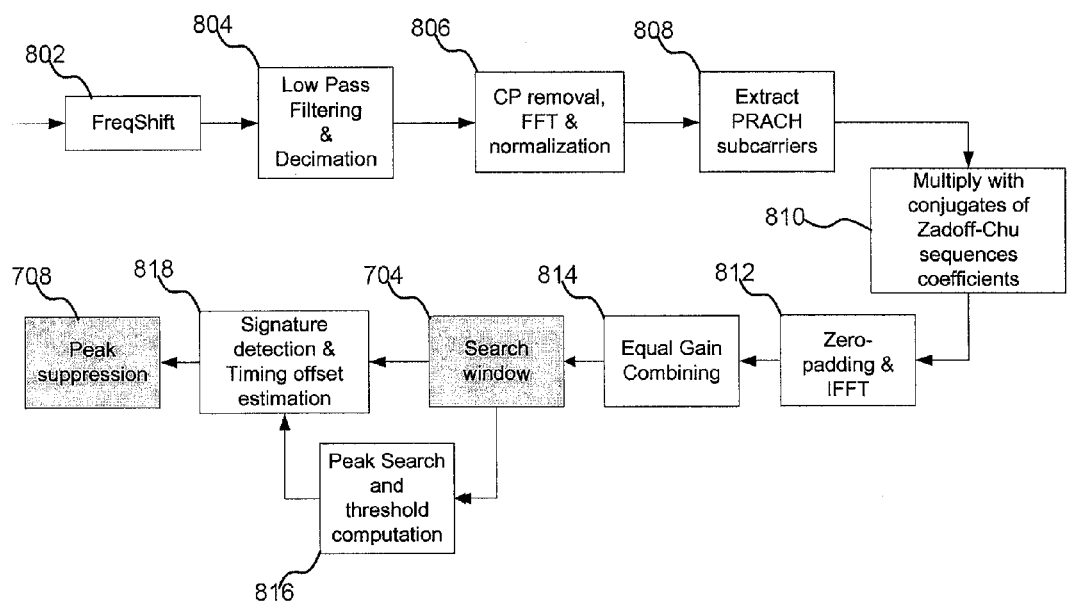
FIG. 8 is a schematic block diagram illustrating another embodiment of a random access signal detection circuit.

FIG. 8 is a schematic block diagram illustrating another embodiment of random access signal detection circuit 300. In this embodiment, the random access detection circuit 300 includes frequency shift module 802. Frequency shift module 802 may perform a frequency shift operation on received samples to avoid noise propagation due to decimation in later stages of circuit 300. Once frequency shift module 802 performs the frequency shift operation on the samples, it then passes the frequency shifted samples to low pass filtering and decimation module 804. In one embodiment, the low pass filter may be centered at zero frequency. The filter coefficients and downsampling rate of low pass filter and decimation module 804 may be variable, and may be determined in response to the PRACH format chosen. CP removal, FFT & normalization module 806 may remove Cyclic Prefix (CP), perform a Fast Fourier Transform (FFT) on the received signal to convert the signal into frequency domain for processing and normalize the signal. The frequency domain signals are then sent to module 808 so that the PRACH subcarriers may be extracted from the frequency domain signals. The PRACH subcarriers are then multiplied with conjugates of ZC sequences in module 810. To assist in further processing, the sequences may be zero-padded and inverse Fourier transformed by module 812. Equal gain combining module 814 further conditions the signals and the search window is applied by module 704. Peak search and threshold computation module 816 may identify peaks in each signature detection interval that are within set threshold guidelines. Signature detection and timing offset estimation module 818 may then detect a signature and determine the timing offsets of each peak in the signatures. Additionally, peak suppression module 708 may suppress any extra peaks 602 that are identified through use of timing offset thresholds.

Figure 9:
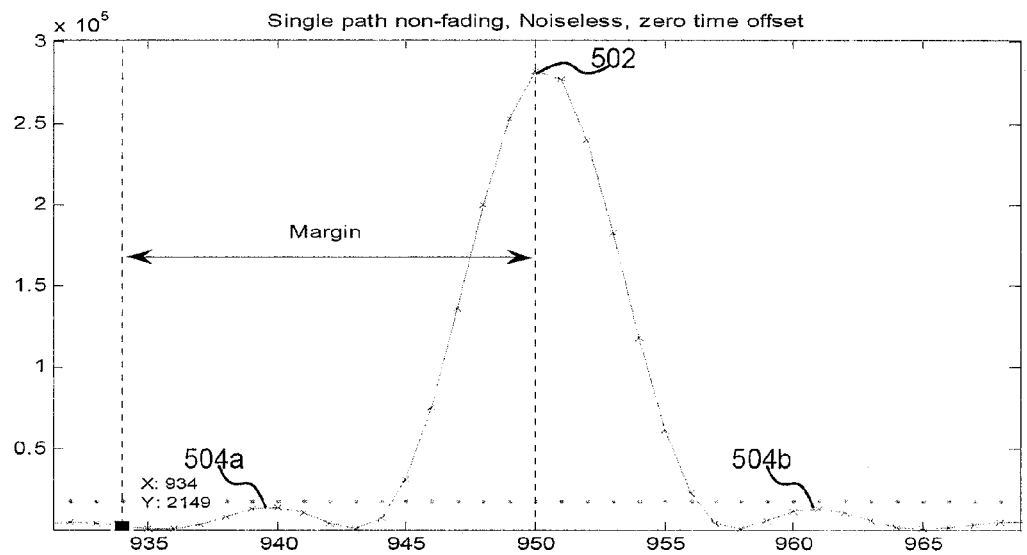
FIG. 9 is a graphical diagram illustrating a method for calculating a margin size in response to an oversampling rate.
Figure 10:
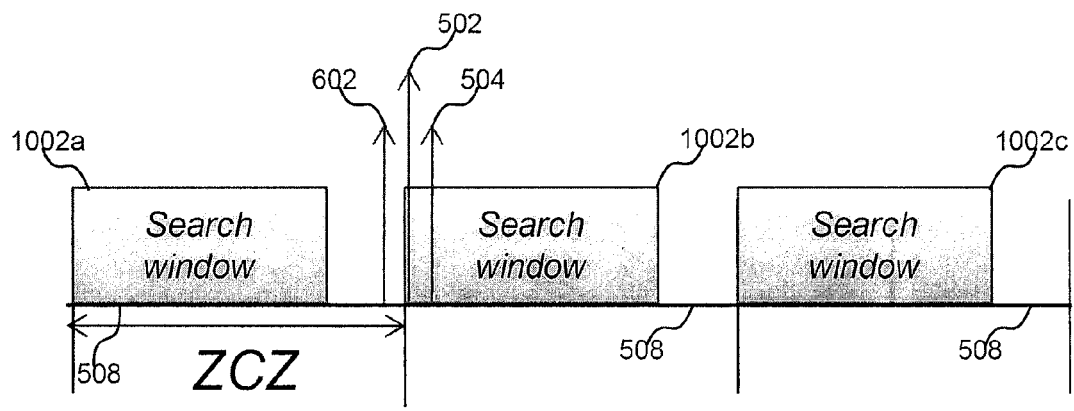
FIG. 10 is a graphical diagram illustrating a method for detecting a random access channel signal with a search window and a PSA.

FIG. 9 is a graphical diagram illustrating a method for calculating a margin size in response to an oversampling rate and a representation of how oversampling affects power leakage. Here the oversampling rate is the ratio between the FFT size and the number of PRACH subcarriers. Power leakage can be represented as the sinc squared waveform shown in FIG. 9 as opposed to perfect sharp peaks in FIG. 2. In short time offset cases, i.e. UEs close to base stations, the wider peak leaks power to the signature detection interval on the left causing an extra detected preamble. In addition, side peaks 504a-b may become large enough that they are identified as additional extra peaks 602 as shown in FIG. 10. In such an embodiment, the performance of the system may be degraded. To combat system performance degradation, a window margin should be larger than twice the oversampling rate, which is the distance between the main peak and the first side peak. Additionally, the window size should correspond to the size of the cell 102a-b.

FIG. 10 is a graphical diagram illustrating a method for detecting a random access channel signal with a search window and a PSA. In the depicted embodiment, the main peak 502 has a short time offset. First side peak 504 may be generated by the power leakage from oversampling and may fall to the right of highest peak 502. Additionally, when UE 106 is close to base station, power leakage may spill over into an adjacent ZCZ 508 on the left of highest peak 502, resulting in an extra peak 602. In such instances, extra peak 602 to the left of the highest peak 502 is ignored, because it does not fall within search window 1002a. Thus, in such an embodiment, only peaks 502, 504 considered for signature determination, and peak 504 may also be discarded because it is lower than highest peak 502. Beneficially, such an embodiment is effective when UEs 106 are close to base station 104. Only the highest peak 502 in each window 1002a-c is selected.

Figure 11:
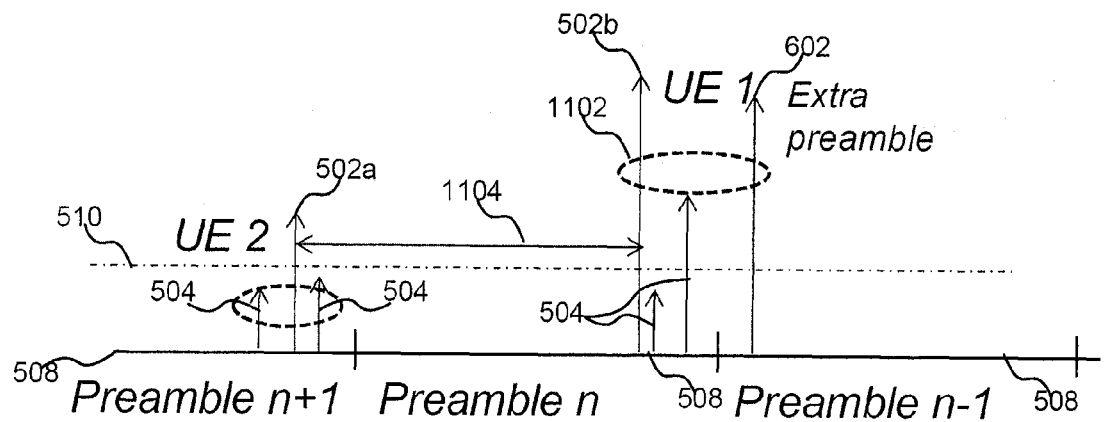
FIG. 11 is a graphical representation of one embodiment of a method for excluding superfluous preambles.

FIG. 11 is a graphical representation of one embodiment of a method for suppressing superfluous preambles. This embodiment of a method is effective for situations where UEs 106a-d are located far from base stations 104a-c and in where large delay spread is exhibited. In such situations, random access detection circuit 300 may receive multiple random access channel signals. In one embodiment, a time difference threshold 1102 may be used to determine whether the received peaks in adjacent ZCZs 508 are from the same UE 106. For example, the random access detection circuit 300 may receive three high-amplitude peaks 502a, 502b, and 602. In order to determine which of the three peaks are real, and which are to be suppressed in order to avoid false alarm events, a time difference threshold 1102 is used. For example, time difference 1104 between peak 502a and 502b is relatively large, so those peaks would be determined to be from different UEs 106. On the other hand, peaks 502b and 602 are received relatively close in time, so they are determined to be from the same UE 106 because they are within time difference threshold 1102. Thus, peak 602 is an extra detected preamble and is therefore suppressed by peak suppression module 708. The time difference threshold may be tuned to provide various degrees of accuracy. In one embodiment, however, the time difference threshold is larger than the predetermined channel delay spread, so that sufficient accuracy may be achieved.

Figure 12:
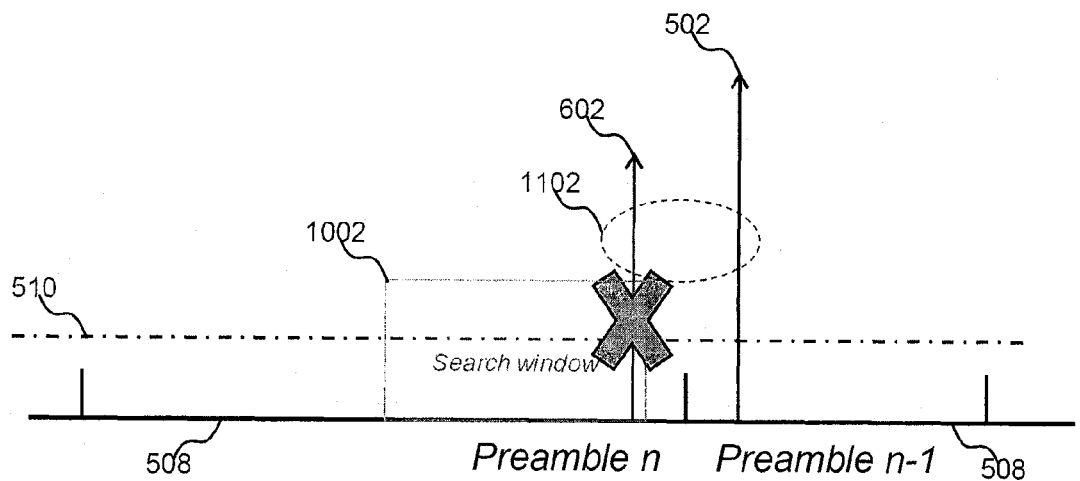
FIG. 12 is a graphical diagram illustrating a method for peak selection through identification of highest amplitude.

FIG. 12 is a graphical diagram illustrating a method for peak selection through identification of a higher amplitude. If it is determined that two of the peaks 502, 602 received by the random access detection circuit 300 are from the same UE 106, then the peak suppression module 708 may select the peak with the lowest amplitude for suppression and allow the higher amplitude peak to pass through. For example, as shown in FIG. 12, it is determined that two peaks 502, 602 were received from the same UE 106. In order to determine which peak is suppressed, the peak suppression module 708 may measure the amplitude of both peaks 502, 602 and suppress the peak with the lowest amplitude. The peak suppression may be accomplished through various signal processing methods. In the depicted embodiment, the lower amplitude signal 602 may be suppressed, even though it is inside of the search window 1002. Thus, the search windowing may be irrelevant for the purposes of peak suppression in one embodiment, so it can be disabled.

Figure 13:
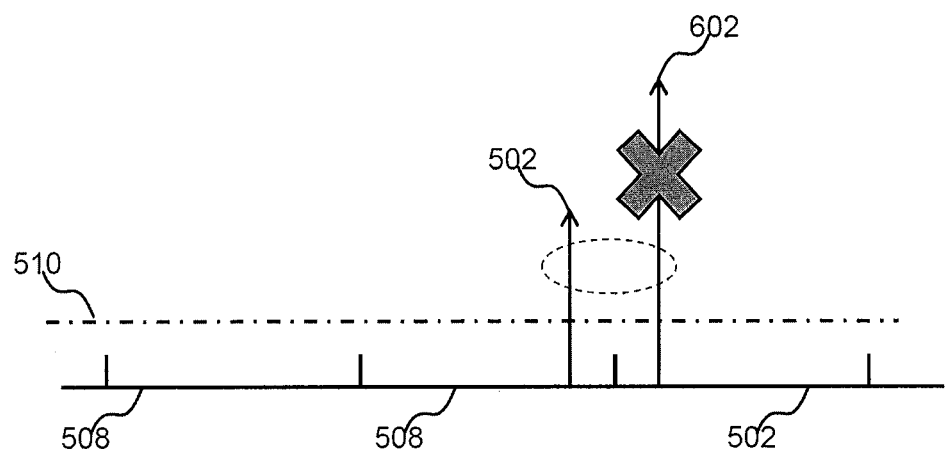
FIG. 13 is a graphical diagram illustrating a method for peak selection though a race condition.

FIG. 13 is a graphical diagram illustrating an alternative embodiment of a method for peak selection, which is based on race conditions. In this embodiment, the same two peaks in FIG. 12 may be received by random access detection circuit 300, but the first peak received may be determined to be the true peak 502, and the second peak received is deemed to be the extra preamble 602. Since the initial step of windowing eliminates extra preambles caused by power leakage to the left, this embodiment of the method is based on the premise that extra peaks due to large time offsets and channel delay spread always slight on the right. Thus, the first peak received 502 is deemed to be true, and any subsequent peak 602 is deemed to be fake. One of ordinary skill in the art will recognize situations in which the method of FIG. 12 is more suitable for peak suppression, and other situations where FIG. 13 is more suitable for peak suppression. In one embodiment, both options may be provided to a user as configuration settings of the random access detection circuit 300.

Figure 14:
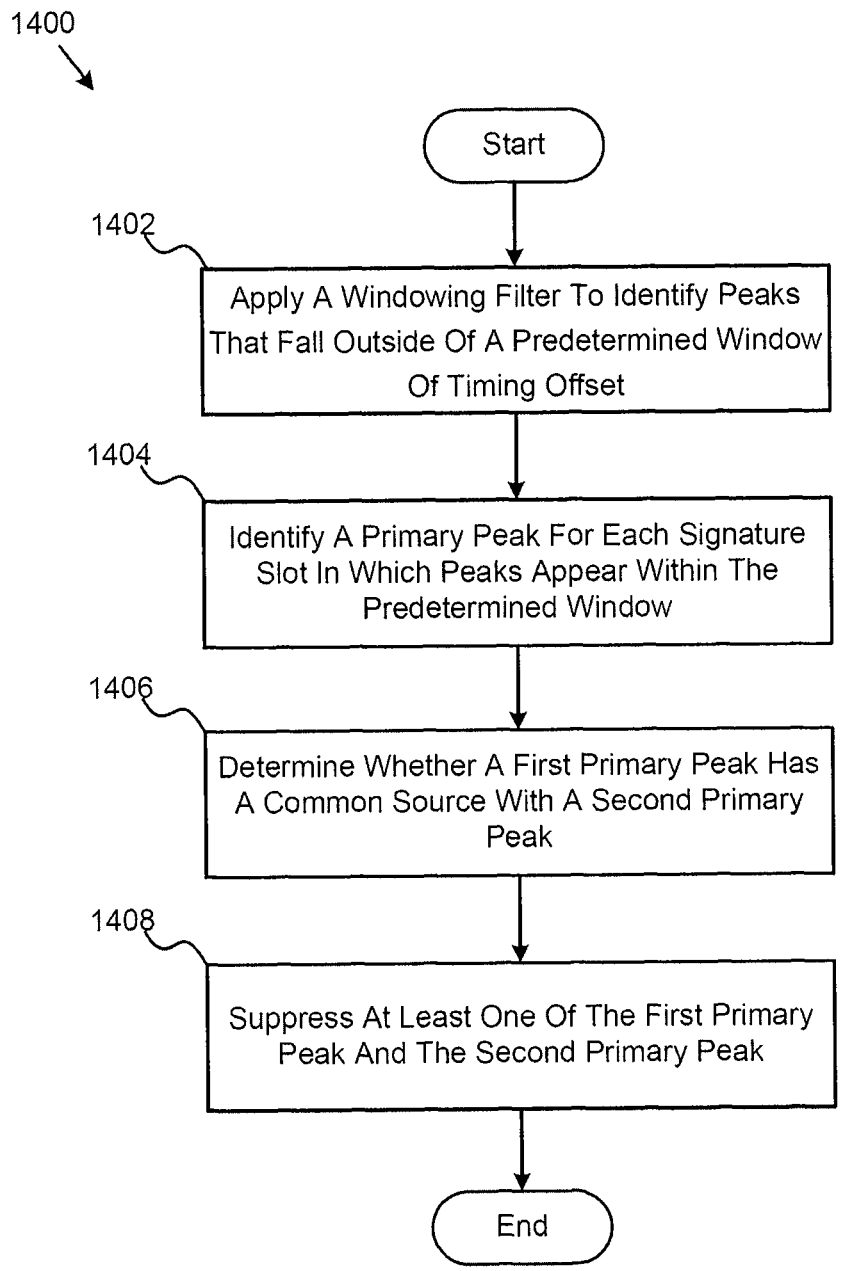
FIG. 14 is a schematic flowchart diagram illustrating one embodiment of a method for peak selection in a random access channel system.

FIG. 14 is a schematic flowchart diagram illustrating one embodiment of method 1400 for peak selection in a random access channel system. In one embodiment, windower module 704 may apply a windowing filter to identify peaks that fall outside of a predetermined window of timing offset at block 1402. In one embodiment, the timing offset being referenced to a zero-offset point of a random access signature slot. Signature detection module 706 may then identify a primary peak for each signature slot in which peaks appear within the predetermined window, as shown in block 1404. Peak suppression module 704 may then determine whether a first primary peak has a common source with a second primary peak as shown at block 1406, and suppress at least one of the first primary peak and the second primary peak in response to a determination that the first primary peak and the second primary peak have a common source as shown at block 1408.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for detecting physical random access channel signals with high accuracy and low false alarm rate comprising:
   applying a windowing filter to identify peaks that fall outside of a predetermined window of timing offset, the timing offset being referenced to a zero-offset point of a random access signature slot;
   identifying a primary peak for each signature slot in which peaks appear within the predetermined window;
   determining whether a first primary peak has a common source with a second primary peak; and
   suppressing at least one of the first primary peak and the second primary peak in response to a determination that the first primary peak and the second primary peak have a common source.

2. The method of claim 1, wherein determining whether the first and second peaks have a common source comprises applying a time-difference threshold to determine whether peaks are received from distinct user equipment or from common user equipment.

3. The method of claim 2, wherein peaks having a time difference above the time-difference threshold are determined to originate from distinct user equipment.

4. The method of claim 2, wherein peaks having a time difference below the time-difference threshold are determined to originate from common user equipment.

5. The method of claim 1, further comprising disregarding a peak which falls outside of the predetermined window of timing offset.

6. The method of claim 1, wherein suppressing the peaks comprises measuring an amplitude of each of the peaks determined to originate from common user equipment, and suppressing the all of the peaks except the peak having the highest amplitude.

7. The method of claim 1, wherein suppressing the peaks comprises suppressing all peaks determined to originate from common user equipment, except for the first peak received.

8. The method of claim 1, further comprising applying an amplitude threshold to eliminate peaks having an amplitude below a predetermined amplitude threshold value.

9. An apparatus for detecting physical random access channel signals with high accuracy and low false alarm rate comprising:
   a windowing module to apply a windowing filter to identify peaks that fall outside of a predetermined window of timing offset, the timing offset being referenced to a zero-offset point of a random access signature slot; a signature detection module to identify a primary peak for each signature slot in which peaks appear within the predetermined window; and
   a peak suppression module coupled to the signature detection module and to:
   determine whether a first primary peak has a common source with a second primary peak; and
   suppress at least one of the first primary peak and the second primary peak in response to a determination that the first primary peak and the second primary peak have a common source.

10. The apparatus of claim 9, wherein the peak suppression module is to apply a time-difference threshold to determine whether peaks are received from distinct user equipment or from common user equipment.

11. The apparatus of claim 10, wherein the peak suppression module is to pass though peaks having a time difference above the time-difference threshold.

12. The apparatus of claim 10, wherein the peak suppression module is to suppress peaks having a time difference below the time-difference threshold.

13. The apparatus of claim 10, wherein the peak suppression module is to suppress all but one of the peaks having a time difference below the time-difference threshold.

14. The apparatus of claim 13, wherein the peak suppression module is to measure an amplitude of each of the peaks having a time difference below the time-difference threshold, and suppressing the all of the peaks except the peak having the highest amplitude.

15. The apparatus of claim 13, wherein the peak suppression module is to suppress all peaks having a time difference below the time-difference threshold, except for the first peak received.

16. The apparatus of claim 9, wherein the peak suppression module is to apply an amplitude threshold to eliminate peaks having an amplitude below a predetermined amplitude threshold value.

17. A tangible non-transitory medium comprising instructions that, when executed by a processing device, cause the processing device to perform operations comprising:
   applying a windowing filter to identify peaks that fall outside of a predetermined window of timing offset, the timing offset being referenced to a zero-offset point of a random access signature slot;
   identifying a primary peak for each signature slot in which peaks appear within the predetermined window;
   determining whether a first primary peak has a common source with a second primary peak; and suppressing at least one of the first primary peak and the second primary peak in response to a determination that the first primary peak and the second primary peak have a common source.

18. The tangible non-transitory medium of claim 17, wherein the operations comprise applying a time-difference threshold to determine whether peaks are received from distinct user equipment or from common user equipment.

19. The tangible non-transitory medium of claim 18, wherein the operations comprise passing though peaks having a time difference above the time-difference threshold.

20. The tangible non-transitory medium of claim 18, wherein the operations comprise suppressing peaks having a time difference below the time-difference threshold.

21. The tangible non-transitory medium of claim 17, wherein the operations comprise disregarding a peak which falls outside of the predetermined window of timing offset.

22. The tangible non-transitory medium of claim 17, wherein the operations comprise measuring an amplitude of each of the peaks having a time difference below the time-difference threshold, and suppressing the all of the peaks except the peak having the highest amplitude.

23. The tangible non-transitory medium of claim 17, wherein the operations comprise suppressing all peaks having a time difference below the time-difference threshold, except for the first peak received.

24. The tangible non-transitory medium of claim 17, wherein the operations comprise applying an amplitude threshold to eliminate peaks having an amplitude below a predetermined amplitude threshold value.

\* \* \* \* \*